M. J. OWENS.
GLASS GATHERING AND SHAPING MACHINE.
APPLICATION FILED APR. 18, 1912.
1,364,514.
Patented Jan. 4, 1921.
2 SHEETS—SHEET 1.
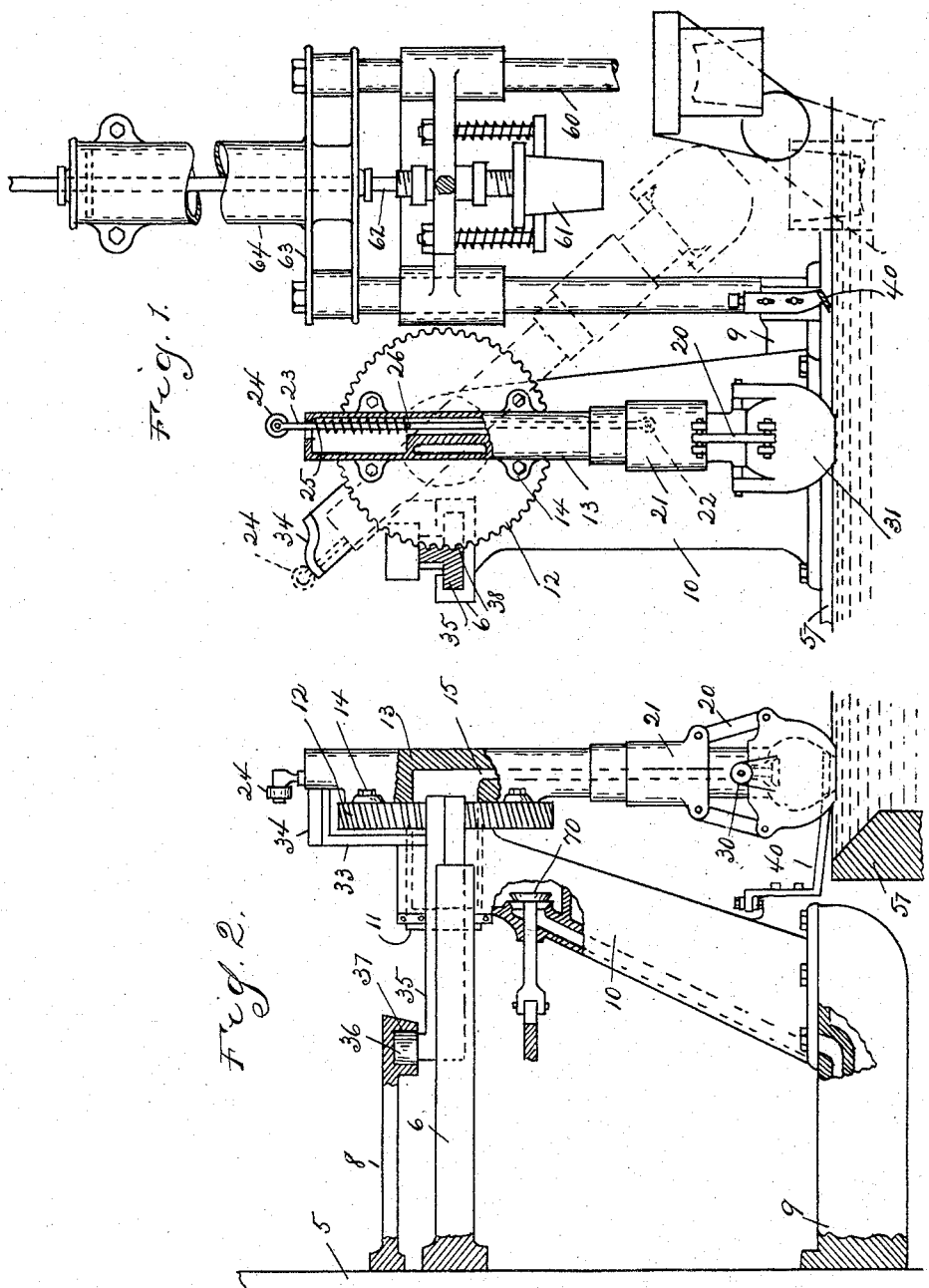

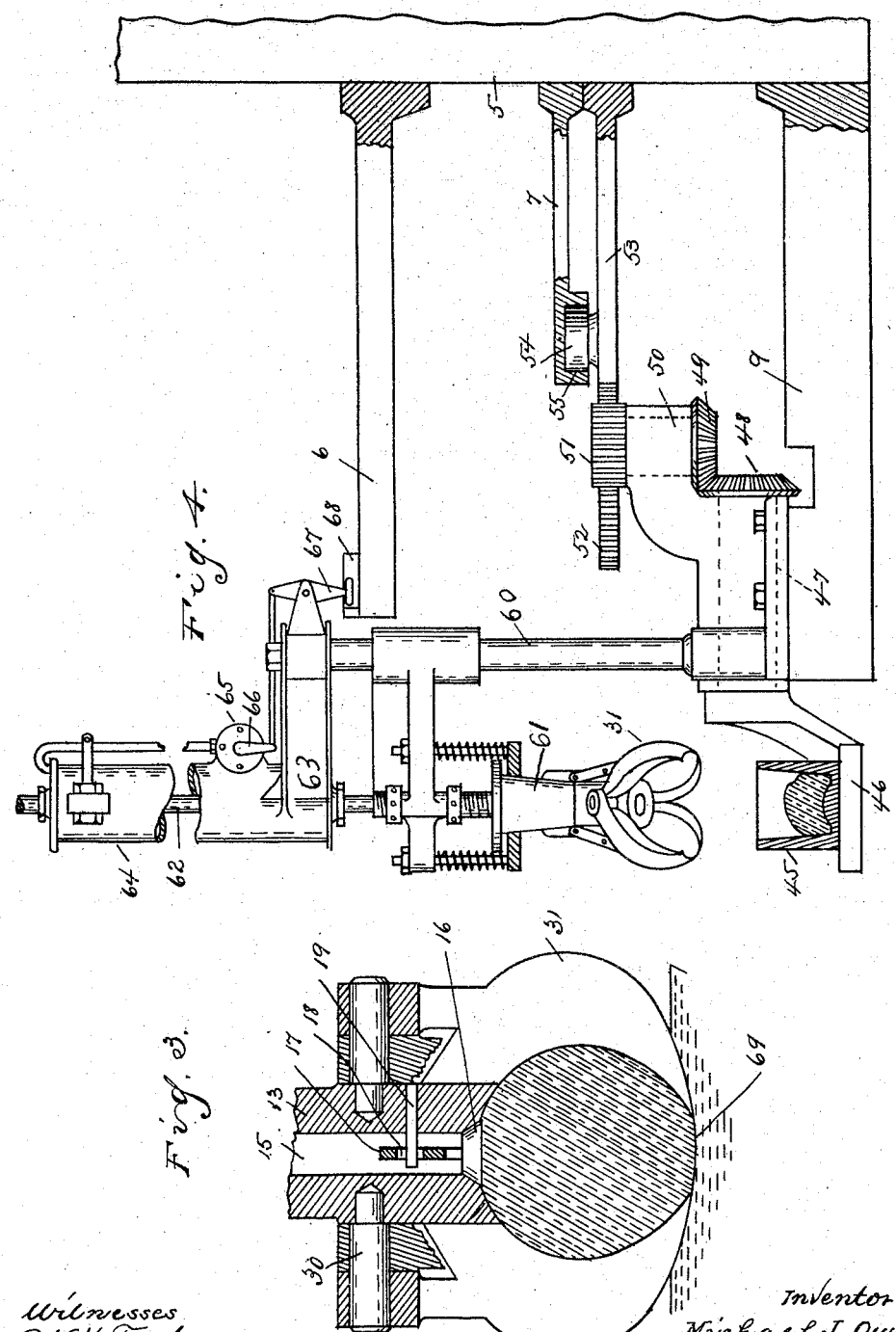

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS GATHERING AND SHAPING MACHINE.

1,364,514.   Specification of Letters Patent.   Patented Jan. 4, 1921.

Application filed April 18, 1912. Serial No. 691,589.

*To all whom it may concern:*

Be it known that I, MICHAEL J. OWENS, a citizen of the United States of America, residing at Toledo, in the county of Lucas and State of Ohio, have invented certain new and useful Improvements in Glass Gathering and Shaping Machines, of which the following is a specification, reference being had therein to the accompanying drawings.

The invention consists in the construction of a machine designed to gather a definite quantity of glass from the mass and shape it into an article, consisting of a gathering machine of the general type shown in my previous Patent No. 766,768, dated August 2nd, 1904, and combined therewith the specific illustration of glass pressing mechanism to which the gathered glass is delivered and in which it is shaped into the desired form; and further in the construction, arrangement and combination of the various parts hereinafter more fully described and particularly pointed out in the claims.

In the drawings:

Figure 1 is a front elevation of the gathering and pressing mechanism, the parts being shown in full lines in position for gathering and in dotted lines in position for delivering the gather to the press-mold, parts being shown in section;

Fig. 2 is a side elevation of the gathering mechanism, partly in section;

Fig. 3 is a vertical central section at right angles to Fig. 2 through the gathering cup or receptacle; and Fig. 4 is a side elevation of the press-mold at the side of the machine, showing the gathering-cup in position to deliver the gathered glass to the press-mold.

In the drawings 5 represents a suitable standard to which are secured the spiders 6, 7 and 8 and on which is rotatably mounted the frame 9. I have not illustrated the exact construction of the standard 5, the frame 9 and the means for rotating such frame around the standard, as the same is well understood and similar mountings and driving mechanism are shown in my previous patents. Any suitable mounting and driving mechanism may be employed for this purpose.

In machines of this kind it is customary to mount upon a single rotating frame a series of devices which successively come to the mass of molten glass to gather the desired quantity, and in this instance I have shown but a single one of the devices—which may be mounted, if desired, in multiple upon the frame 9 at different radial points; and as all would be alike a description of the construction and operation of one will suffice for the others:—

Upon the outer portion of the frame 9 is a standard 10 which, at its upper end, has a bearing in which is journaled the stub-shaft 11 to which is secured the worm-wheel 12, and to this worm-wheel is secured the gathering-head 13. In this case I have shown the gathering-head attached to the worm-wheel by means of bolts 14.

The gathering-head has a passage 15 therethrough which leads down to the lower end thereof and at the lower end is controlled by a check-valve 16, which has a limited play and in this instance I have shown its stem 17 provided with a slot 18 in which a pin 19 engages, allowing the check-valve to rise and fall the length of the slot.

The lower end of the gathering-head is provided with trunnions 30 on which are journaled the two like sections 31 of the gathering-cup or receptacle. These sections are opened and closed by means of links 20 connected at their lower ends to the cup sections and at their upper ends to the sliding sleeve 21 which encircles the lower end of the gathering-head. The sleeve 21 is connected by a pin 22 to a vertical rod 23 which extends through the upper end of the gathering-head and is there provided with a roller 24.

25 is a spring encircling the rod 23 and bearing on its upper end against the top of the suction-head and at its lower end against a pin 26, the spring acting by its tension to normally hold the sleeve downward and thus hold the cup-sections closed, as shown in Figs. 1, 2 and 3.

On the spider or bracket 6 is a bracket 33 having on its end a cam 34 in the path of the roller 24, so arranged that when, as hereinafter described, the suction-head is rocked upon the shaft 11 the roller will strike the cam and draw the rod 23 longitudinally and, through the sleeve 21 and links 22, open the two sections of the cup or gathering-head, as shown in Fig. 4, to discharge the gathered glass.

The suction-head is rotated about its supporting pivot by any suitable means. I have shown the rotation effected by means of a slide 35 in the spider or bracket 6 and having at its end a roller 36 engaging a cam-way 37 on the underside of the spider or bracket 8; this cam-way being shaped so that at suitable points in the travel of the suction-head upon the standard the slide will be moved inward and outward. The inner face of the slide 35 is provided with suitable complementary worm-teeth 38 engaging with the teeth on the worm-wheel 12, so that the endwise movement of the slide will rotate the wheel and with it the suction-head.

In the path of the suction-head and secured at a suitable point on the frame 9 is a knife or scraper 40 across which the lower edge of the suction-cup or receptacle will scrape and thus disconnect any thread of glass that may be hanging from the glass in the cup from that in the tank.

Beside the gathering-device thus described is a suitable glass pressing mechanism which, in a general way, is similar to glass presses heretofore used for pressing glassware such as tumblers—which is the article which I have shown this machine adapted to make in this instance. This pressing mechanism consists of a press-mold 45 supported on a crank-arm 46 secured at the end of a shaft, 47, journaled in suitable bearings on the traveling frame 9. The end of this shaft is provided with a beveled gear-wheel 48, meshing with a gear-wheel 49 on a vertical shaft 50 which at its upper end carries the pinion 51 with which meshes a rack 52 carried on the spider or frame 53 in suitable slides (not shown). The rack-bar 52 is provided with a roller 54 engaging a camway 55 on the underside of the spider or bracket 7; this camway being of a suitable shape so that the rack-bar will be moved endwise forward and backward and through the connections described will rock the arm 46 from the position shown in Fig. 4 and in dotted lines in Fig. 1, to the position shown in full lines in Fig. 1. The objects of this motion of the press-mold are two-fold: first, to discharge the pressed article therefrom, and second, to raise the press-mold to a position above the glass-tank 57 during the gathering operation.

Supported on the standards 60 on the traveling frame 9 is the pressing plunger 61, of the usual construction in glass press-molds. The stem 62 passes through a head 63 at the upper end of the standard 60 and into a cylinder 64 where it is provided with a piston. This piston, and with it the pressing-plunger, may be raised and lowered by any suitable means: I have here indicated an air-operated device, in which 65 is an air-valve for admitting air to either end of the cylinder and opening the exhaust, this valve having an actuating crank arm 66 connected to a lever 67 which engages a cam-way 68 on the spider or bracket 6; this cam-way being of suitable shape to admit air to raise and lower the plunger, or pressing-head, at suitable points in the operation.

The parts being thus constructed they are intended to operate as follows: Rotary motion being imparted to the traveling frame 9, it rotates about the standard 5 and at one point in its rotation the suction-head will travel over the molten glass in the tank 57. The suction-head may be rocked slightly, so that the suction-head will clear the wall of the tank, and then lowered, so that the opening 69 in the lower end of the suction-cup will be brought into close juxtaposition to the surface of the molten glass or may contact it. At this point, by suitable cam mechanism (not shown) a valve 70, controlling the connection to a suitable air-exhaust mechanism, is opened and the vacuum produced in the suction-cup will cause the glass to be forced from the tank into the suction-cup and fill the same. As soon as the glass strikes the check-valve, the cup being filled, it will close the check-valve and at the same time the valve 70, by its cam actuating mechanism, may also be closed.

During this operation the press-mold will be lifted to its upper position shown in full lines in Fig. 1, so that it will pass over the tank. The gathering-head will also be slightly rocked, so that it will clear the edge of the tank and pass over the knife, so as to leave the attached thread of glass in the tank as it clears the edge thereof. As soon as the suction-head and press-mold are free from the tank, through the cam mechanism described, the press-mold may be moved to the position shown in Fig. 4, ready to receive the charge of glass, and the gathering-head will be rocked to the limit of its motion, as shown in dotted lines in Fig. 1. This motion, by means of the roller 24 and its connections to the sections of the gathering-cup, will open the cup and permit the gathered glass to fall by gravity therefrom into the press-mold. The gathering-head will then rock back toward the vertical and out of the path of the plunger 61, when the valve 65 will be opened to admit air upon the top of the piston in the cylinder 64 and the plunger will descend and press the glass to its form. After the plunger has pressed the article to its form it will be withdrawn and the press-mold will be inverted to discharge the finished article therefrom.

These operations will take place in a single revolution of the frame 9 about the standard 5.

By having the pressing mechanism carried with the gathering device and in close association therewith I am enabled to make a much more compact machine than if the gathering and pressing mechanisms were separate machines. I am enabled also to deliver the glass into the press-mold with less chilling effect and with more certainty that it will fall into the cavity at the bottom of the press-mold and with less danger of its falling upon the side or edges of the same as the two devices are traveling together.

What I claim as my invention is:

1. In a glass shaping machine, the combination of a traveling support, a gathering head pivoted to swing on said support, a suction gathering cup on said head, said cup having sections relatively movable to open and close the cup, and mechanical means automatically operable positively to open the cup by and upon the swinging of the head.

2. In a glass-shaping machine, the combination with a glass tank of a travelling frame adapted to travel over a portion of the tank, a mold, a mold support, and means for moving the mold support, with the mold, over the tank at one point in the travel thereof and for lowering the mold below the level of the tank when at another point beyond the tank, and means to charge the mold while in said lowered position.

3. In a glass shaping machine, the combination of a carrier traveling in a predetermined path, supports arranged upon said carrier and in substantially fixed relation thereon, a gathering device mounted upon one of said supports, a pressing device mounted upon the other support, and means for effecting a transfer of the gather from the gathering device to the pressing device.

4. In a glass shaping machine, the combination with a glass tank, of a traveling frame adapted to travel over a portion of the tank, a gathering-head mounted on said frame, adapted to be lowered to a position adjacent the glass in said tank, a mold, a mold support, and means for raising the mold support with the mold to a position above said glass-tank during the gathering operation.

5. In a glass shaping machine, the combination with a glass tank, of a traveling frame adapted to travel over a portion of the tank, a swinging gathering-head mounted on said frame, adapted to be lowered to a position adjacent the glass in said tank, a mold, a mold support, and means for raising the mold support with the mold to a position above said glass-tank during the gathering operation, and for positioning the same after the gathering operation to be beneath said gathering-head substantially at the end of one of its swings.

6. In a machine for making pressed glassware, the combination of gathering mechanism, a mold, means for bringing said gathering mechanism and mold into alinement with each other with the gathering mechanism standing above the mold and for thereafter separating said elements, a presser above the mold and continuously in alinement with the receiving position of the mold, actuating mechanism for the presser, and a single rotatable supporting structure common to all of said apparatus.

7. In a glass shaping machine, the combination of a gathering device, a press mold, a press plunger, means to relatively reciprocate the plunger and mold to and from each other, and means to introduce the gathering device between the plunger and mold while they are separated and discharge a gather into the mold.

8. In glass shaping apparatus, the combination of a traveling carrier, a glass tank, a gathering device and a pressing device located side by side on said carrier, said gathering device mounted for swinging movement on a carrier from a gathering position to a position to deliver a charge to the pressing device.

9. In glass shaping apparatus, the combination with a tank, of a traveling carrier, a gathering head pivoted on said carrier and extending downward from its pivot, a mold on said carrier at one side of the gathering head, means to swing the gathering head about its pivot laterally and upwardly from gathering position to thereby enable it to clear the tank and bring it to discharging position above the mold, and means to discharge the gather into the mold.

10. In glass shaping apparatus, the combination with a traveling carrier, of a gathering device comprising an arm mounted to swing on the carrier and depending from its pivot, a sectional gathering cup carried at the lower end of said arm, means to swing said arm about its pivot to carry the cup laterally and upward from gathering position to position to clear the tank, and means operable by said swinging movement to open the cup and discharge the gather.

11. In glass shaping apparatus, the combination with a traveling carrier, of a gathering device comprising an arm mounted to swing on the carrier and depending from its pivot, a sectional gathering cup carried at the lower end of said arm, means to swing said arm about its pivot to carry the cup laterally and upward from gathering position to position to clear the tank, and means operable by said swinging movement to open the cup and discharge the gather, and a press mold and plunger on said carrier, said cup being over the press mold when in discharging position so that the gather is dropped into the mold.

In testimony whereof I affix my signature in presence of two witnesses.

MICHAEL J. OWENS.

Witnesses:
 T. H. MILLER,
 M. B. KOHLER.